United States Patent [19]

Norton, II

[11] Patent Number: 4,472,005
[45] Date of Patent: Sep. 18, 1984

[54] BEARING RING OR THE LIKE WITH SET SCREW

[75] Inventor: George H. Norton, II, Kensington, Conn.

[73] Assignee: Textron Inc., Providence, R.I.

[21] Appl. No.: 485,423

[22] Filed: Apr. 15, 1983

[51] Int. Cl.³ .............................................. F16C 35/06
[52] U.S. Cl. ................................ 308/189 R; 403/362; 411/393
[58] Field of Search ........... 308/189 R, 189 A, 207 R, 308/207 A; 403/362; 411/393

[56] References Cited

U.S. PATENT DOCUMENTS

| | | | |
|---|---|---|---|
| 2,830,635 | 4/1958 | Thorstens | 411/393 |
| 2,987,091 | 6/1961 | Cartlidge | 411/393 |
| 3,082,048 | 3/1963 | Jordan et al. | 403/362 |
| 4,074,923 | 2/1978 | Howe | 403/362 |

Primary Examiner—Lenard A. Footland

Attorney, Agent, or Firm—Hopgood, Calimafde, Kalil Blaustein & Judlowe

[57] ABSTRACT

The invention contemplates an improved set-screw shaft mounting for a machine element such as the inner race ring of an antifriction bearing. Tolerances are closely controlled for both the set-screw threads and the tapped-hole threads, for the case of set-screw threads which are yieldable in the context of an interference (i.e., friction-fit) to the tapped hole, the interference being such as to occasion a friction torque which is but a small fraction of the conventional maximum comfortable torque of wrench application by a machinist, using a conventional wrench, such as an Allen wrench. The low friction torque enables the machinist to know precisely when the set screw intercepts the shaft into which it is driven, and he can then know that his manually applied maximum torque will be serving essentially only the intended purpose of clamping to the shaft. Extended running life is realized for bearings thus mounted, as compared to conventional set-screw clamping.

8 Claims, 3 Drawing Figures

BEARING RING OR THE LIKE WITH SET SCREW

BACKGROUND OF THE INVENTION

The invention relates to set-screw retention of a bearing ring, such as the inner race ring of an antifriction bearing, to a shaft, for hopefully fixed antirotational engagement to the shaft.

Antifriction bearings used in fans, blowers, conveyors and other industrial machinery are frequently slide-fitted (i.e., loosely fitted) into position on straight shafting and locked to the shaft by means of set screws. Set screws are thread-mounted into tapped holes in the inner ring of such a bearing, with a non-interference fit, generally a clearance in the order of 0.002 inch, because an interference fit can give rise to such local stress as to rupture the ring, it being noted that generally the pitch diameter of threads in the tapped hole is greater than inner-ring thickness, i.e., greater than depth of the tapped hole.

Orlomoski, U.S. Pat. No. 3,517,717 discloses self-locking screws with threads having yieldable rib formations for such interference fit to tapped holes as to effectively lock a screw against looseness, virtually regardless of the vibratory (or rotating) and load environment to which the parts secured by the screw may be subjected. But the use of threads with yieldable rib formations presents a problem for bearing-ring mounting to a shaft, because conventional specifications for the interference fit of such screws call for such high interference as offer unpredictable set-screw holding ability. High interference suggests the prospect of great holding ability, but this is a delusion if, as is the fact with current specifications, the torque needed to advance the high-interference set-screw fit is anything like the maximum torque to which the inner bearing ring can be safely subjected. There is thus uncertainty as to whether the encountered torque is that of binding the set-screw point to the shaft or is that of advancing the set screw in the tapped hole. With such uncertainty, the value of interference fit via yieldable thread formations can be lost, and what the machinist may have thought was a good setting torque for binding the inner ring to the shaft may turn out to be an ineffective, inadequate and destructive fit, destructive of the parts, of bearing life, and of production time for the involved machine.

BRIEF STATEMENT OF THE INVENTION

It is an object of the invention to provide a substantially improved set-screw relationship, for the specific situation of effectively anchoring a shaft-mounted machine element, such as the inner ring of an antifriction bearing, to a shaft.

It is a specific object to achieve the above object within the limitation of use of standard wrench techniques by machinists having merely ordinary skill.

Another specific object is to provide a set-screw and tapped-hole relationship such that yieldable interference characterizes set-screw advance in the tapped hole at a torque level which is materially less than the tolerable maximum torque of binding the set-screw point into the shaft, so that the machinist will not be deceived or uncertain with regard to effectiveness of his securing the bearing ring to the shaft.

For the range of shaft sizes evaluated to date, namely, shafts of ½ to 2-inch diameter, the invention achieves the foregoing objects by careful control of tolerances as to set-screw pitch diameter and as to pitch diameter of threads in the tapped hole. Generally, for this range of shaft size, for which set-screw sizes will range from so called "10-32" at the small end to "⅜×24" at the large end, the maximum combined interference of the involved pitch diameters is about 0.005 inch, resulting in screw-advancing torsional resistance which is but a small fraction of the tolerable maximum torque of binding the screw point into the shaft.

DETAILED DESCRIPTION

The invention will be described for a preferred embodiment, in conjunction with the accompanying drawings, in which.

Figure 1:
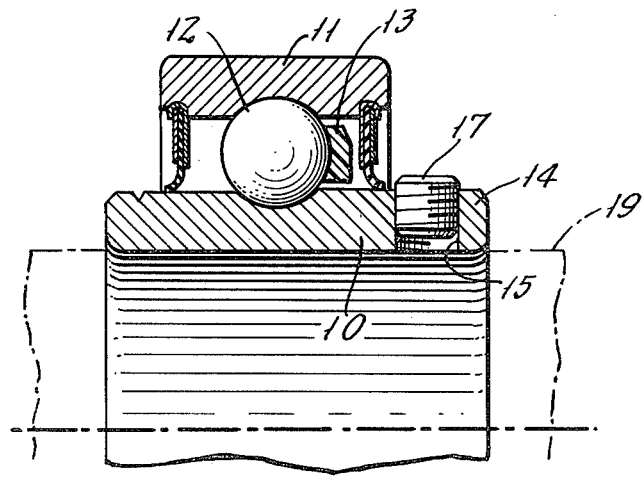
FIG. 1 is a fragmentary vertical sectional view through an antifriction bearing suitable for set-screw mounting to a shaft.
Figure 2:
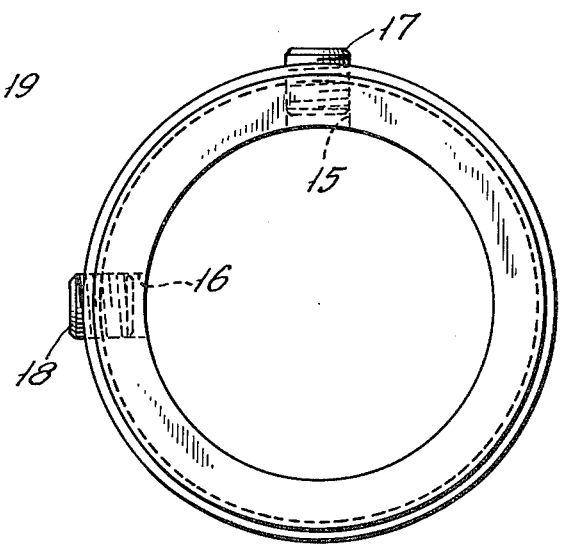
FIG. 2 is a left-end view of the inner ring of the bearing of FIG. 1.

FIG. 1 shows the invention embodied in an anti-friction bearing comprising inner and outer race rings 10-11 with interposed antifriction elements 12 riding the races of rings 10-11, and with a plastic retainer 13 holding the elements 12 in suitably spaced relation about the bearing axis. The particular bearing shown has a so-called wide inner ring 10, for which one axial end extends in a region 14 beyond the corresponding axial end of the outer ring 11; within region 14, two like tapped set-screw holes 15-16 will be understood to accommodate set screws 17-18 at 90-degree spacing about the bearing axis. To lock the inner ring to a shaft 19 of cold rolled steel, the two set screws are driven into the shaft 19, under circumstances of maximum torque and yieldable interference fit, to be described.

Each of the set screws 17-18 is of the self-locking thread variety, commercially available from Holo-Krome Company, West Hartford, Conn., being characterized by a continuous yieldable rib on that flank of the thread which is not relied upon for radially inward force development when driven against the shaft (19). In other words, and considering the driven end of a set screw to be its upper end, the thread of each set screw is specified for full-area conformance of the upper flank (of the thread) to the corresponding flank of the tapped thread 15 (16) in which it is to fit; and the continuous yieldable rib is an integral formation of the lower flank (of the thread) such that it will have specified interference with the lower flank of the tapped thread 15 (16) in which it is to fit.

The foregoing relationship, i.e., set-screw interference with the tapped hole, has been found to require further definition, if the commercially available self-locking set screw is to serve for extended retention of an antifriction bearing ring to a shaft. The reason for this is that data from the commercial source (or from any other source) is not suitable for the mounted-bearing situation. For example, and referring to FIG. 3, commercial-source data and recommendations for a ¼-inch diameter screw having 28 threads per inch call for a standard thread-size tolerance of +0.002 to +0.008 inch, with respect to pitch diameter, and for a tapped-hole thread tolerance of −0.001 to +0.002 inch, with respect to the pitch diameter; with such tolerances, the torque to advance the screw in its tapped hole can be as great as 25 inch-pounds.

For the case of a socketed set-screw configuration, as shown for standard Allen-wrench drive of the set screw, it is considered that a maximum tightening torque of 75 inch-pounds is the practical limit of wrench-driven action. This torque is readily, comfortably and manually achievable by the machinist, using the standard Allen-wrench; but the problem with standard tolerance specifications is that, even if they are carefully followed, the machinist will have great difficulty in recognizing the point at which the screw engages the shaft and in knowing that he has applied sufficient torque (beyond the frictional torque of screw advance in the tapped hole) to produce an effective screw-point engagement to the shaft. If friction torque is too great, the machinist can be deceived into thinking he has tightened the screw to the shaft when in fact he has either not reached the shaft or he has only barely engaged the shaft.

Figure 3:
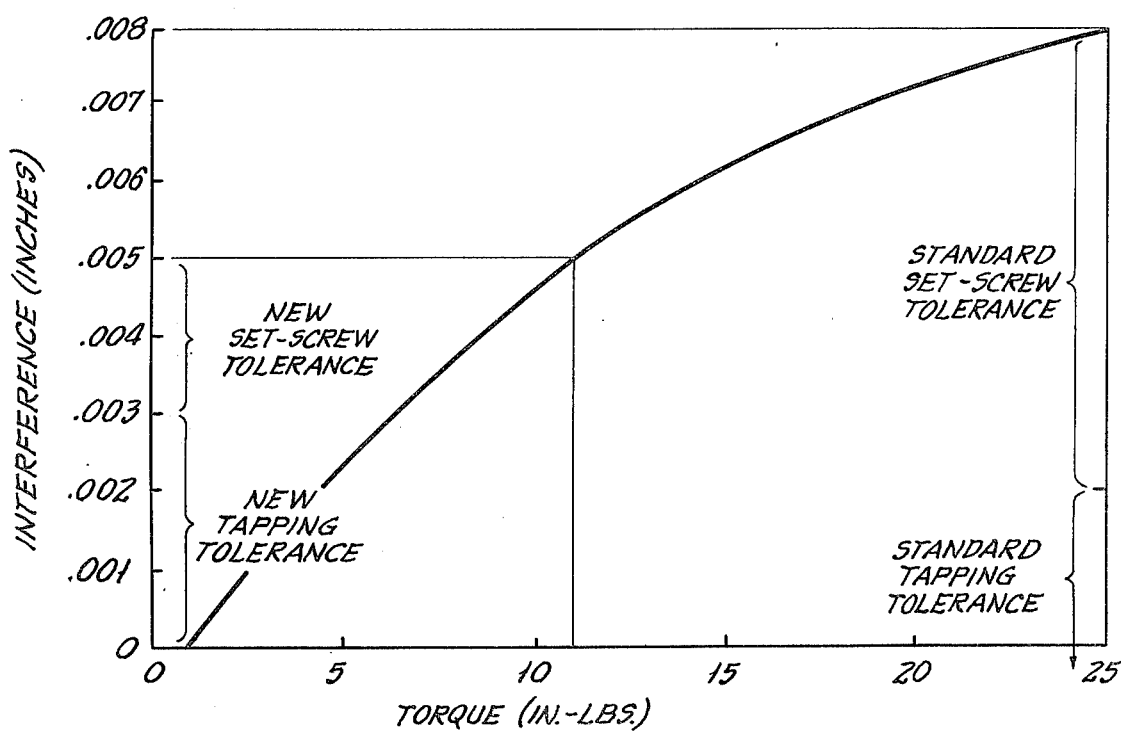
FIG. 3 is a graph depicting torque as a function of interference, to comparatively show a range of critical importance to the invention, as compared with standard dimensional relationships.

In accordance with the invention, tolerances are so selected for both the set screws and the tapped holes that a maximum friction torque of 11 inch-pounds is realized, thus providing a substantially enlarged margin within which to be assured that 75 inch-pound wrench torque will very substantially drive the point of each set screw against the shaft. At the same time, the further result is obtained that set-screw engagement to the shaft is an unmistakable event, calling for immediate elevation of torque, at very little incremental rotation of the screw. To achieve this result, for the ¼-inch by 28 screws involved, FIG. 3 shows that tapped-hole thread tolerance plus set-screw thread tolerance should, when combined, not exceed 0.005 inch; illustratively, this results from a tapped-hole thread tolerance of 0 to 0.003 inch and a set-screw thread tolerance of 0.003 to 0.005 inch, each with respect to the pitch diameter of the threads.

For set-screw tolerance of the character indicated, in conjunction with a bearing inner ring 10 of 1.000 to 1.005 inch bore diameter and 1.332 outer diameter, fitted to shafting of 0.996-inch diameter cold rolled steel, very dramatic improvements in inner ring mounting have been observed in destructive misaligning overload testing. In these cases, the set screws have been ¼×28 gaged to 0.2268 inch pitch diameter within the tolerance +0.003 to +0.005; screw length has been 0.187 inch, from an Allen-socketed upper end to a concaved (118° included angle) and spirally knurled "point", all of hardness $R_c$ 45 to 53. And the inner-race ring hardness has been $R_c$ 59 to 63. All bearings tested were subjected to what would otherwise be considered a destructive misaligning overload, spring-loaded at a level of 440 inch-pounds in the direction to twist the bearing raceways out of the same plane, and with a steady driven inner-ring speed of 755 r.p.m. Bearings retained by standard set-screws (i.e., non-yielding and not self-locking) would loosen their set screws in relatively short time (e.g., less than one minute to a small number of hours) or would ultimately destroy the bearing, whereas those retained by the indicated clearance-controlled interference fit of yieldable set-screws 17-18, not only is the number of hours extended more than ten-fold, but in virtually every case, the bearing remained in place on the shaft, even though the bearings showed signs of wear; and in a significant number of cases, the mounted bearing was fit for further service, even after 250-hours running.

The invention has been described for the specific example of yieldable set-screw fastenings, with low-torque interference fit, in the so-called ¼×28 size. The principles of the invention have, however, been found to be applicable to other sizes, accommodated on shafts ranging from 0.5-inch to 2 3/16-inch diameter, for which applicable set-screw sizes are as follows:

| Threads | Allen-Wrench Torque Limit | Design Maximum Friction Torque | Maximum Combined Interference, Over Pitch Diameter |
|---------|---------------------------|--------------------------------|----------------------------------------------------|
| 10-32   | 33 in.-lbs.               | 11 in.-lbs.                    | 0.005                                              |
| ¼-28    | 75 in.-lbs.               | 11 in.-lbs.                    | 0.005                                              |
| 5/16-24 | 150 in.-lbs.              | 21 in.-lbs.                    | 0.006                                              |
| ⅜-24    | 270 in.-lbs.              | 25 in.-lbs.                    | 0.006                                              |

In the discussion thus far, it has been brought out that the drag torque of the advancing set screw should not be so great as to deceive the mechanic into thinking the set screw point is tight against the shaft when in fact it is not. A further corollary benefit of controlling this torque is that the difference between the drag torque and the maximum turning torque (i.e., 75 in.-lbs. for the ¼-inch size) is the torque range available within which to lock the inner ring 10 to the shaft. In other words, if drag torque is too great, there may not be enough torque range within which to assuredly and securely lock ring 10 to the shaft; yet, with the invention, the lesser drag torque provides a large range within which to develop an assuredly secure locked relationship.

While the invention has been described in detail for a specific embodiment, it will be understood that modifications may be made, as for different sizes and thread specifications, without departing from the scope of the invention.

What is claimed is:

1. An antifriction bearing, comprising inner and outer race rings, antifriction elements riding the races of said rings, at least one axial end of said inner ring being characterized by a region extending axially beyond the corresponding axial end of said outer bearing ring, a tapped radial set-screw hole in said inner-ring region, and a set screw in said tapped hole, the pitch diameter of said set screw being in the range up to at least substantially ⅜ inch, and the threads of said set screw and tapped hole having yieldable interference fit with a combined maximum interference of substantially 0.005 inch.

2. An antifriction bearing according to claim 1, in which said tapped hole is one of two at substantially 90-degree spacing, and said set screw is one of two in the respective tapped holes.

3. An antifriction bearing according to claim 1, in which said set screw is of pitch diameter greater than its length.

4. An antifriction bearing according to claim 1, in which the pitch diameter of threads in said tapped hole is greater than the thickness of said inner race ring.

5. An antifriction bearing according to claim 1, in which said set screw has threads with yieldable rib formations having yieldable interference fit with standard threads in the tapped hole.

6. An antifriction bearing according to claim 1, in which the inner end of said set screw is of the knurled-cup variety.

7. As an article of manufacture, a machine element having a circumferentially continuous annular body of bore to fit a shaft, a tapped radial set-screw hole in said body, and a set screw in said tapped hole, the pitch diameter of said set screw being in the range up to at least substantially ⅜ inch, and the threads of said set screw and tapped hole having yieldable interference fit with a combined maximum interference of substantially 0.005 inch.

8. The article of claim 7, wherein said element is the inner race ring of an antifriction bearing, and said tapped hole is intermediate the raceway region and one of the axial ends of said ring.

* * * * *